United States Patent
Kurimoto et al.

[15] 3,691,655
[45] Sept. 19, 1972

[54] MACHINE TOOL WITH TOOL CHANGE DEVICE

[72] Inventors: Mikishi Kurimoto, Nagoya; Yoshiki Ochiai, Okazaki; Keniti Munekata, Kariya; Kenji Nomura, Ogawa, all of Japan

[73] Assignee: Toyoda Koki Kabushiki Kaisha, Kariyi-shi, Aichi-ken, Japan

[22] Filed: Jan. 15, 1971

[21] Appl. No.: 106,717

[30] Foreign Application Priority Data
Jan. 15, 1970 Japan .....................45/3995

[52] U.S. Cl. ................................................29/568
[51] Int. Cl. ...........................................B23q 3/157
[58] Field of Search...........................29/568, 26 A

[56] References Cited

UNITED STATES PATENTS

| | | | |
|---|---|---|---|
| 3,161,951 | 12/1964 | Anthony | 29/568 |
| 3,443,310 | 5/1969 | Burroughs et al. | 29/568 |
| 3,516,149 | 6/1970 | Mickas | 29/568 |
| 3,530,570 | 9/1970 | Shotter | 29/568 |

Primary Examiner—Andrew R. Juhasz
Assistant Examiner—Z. R. Belinsky
Attorney—Oblon, Fisher & Spivak

[57] ABSTRACT

A machine tool is provided with an automatic tool change device for permitting the same to perform a variety of machining operations on a workpiece. The tool change device comprises a tool storage magazine installed on the floor for removably storing diverse tools and a carriage mounted on an upstanding column of the machine and carrying a tool holding device thereon. The carriage follows the movement of a spindle head receiving a spindle therein so that a tool change operation can be effected between the tool holding device and the spindle by a main transfer arm immediately following a machine operation. Means are also provided for rendering the following movement of the carriage inoperative so that a tool change operation by a sub-transfer arm may be performed between the tool holding device and the tool storage magazine during the machining operation.

8 Claims, 28 Drawing Figures

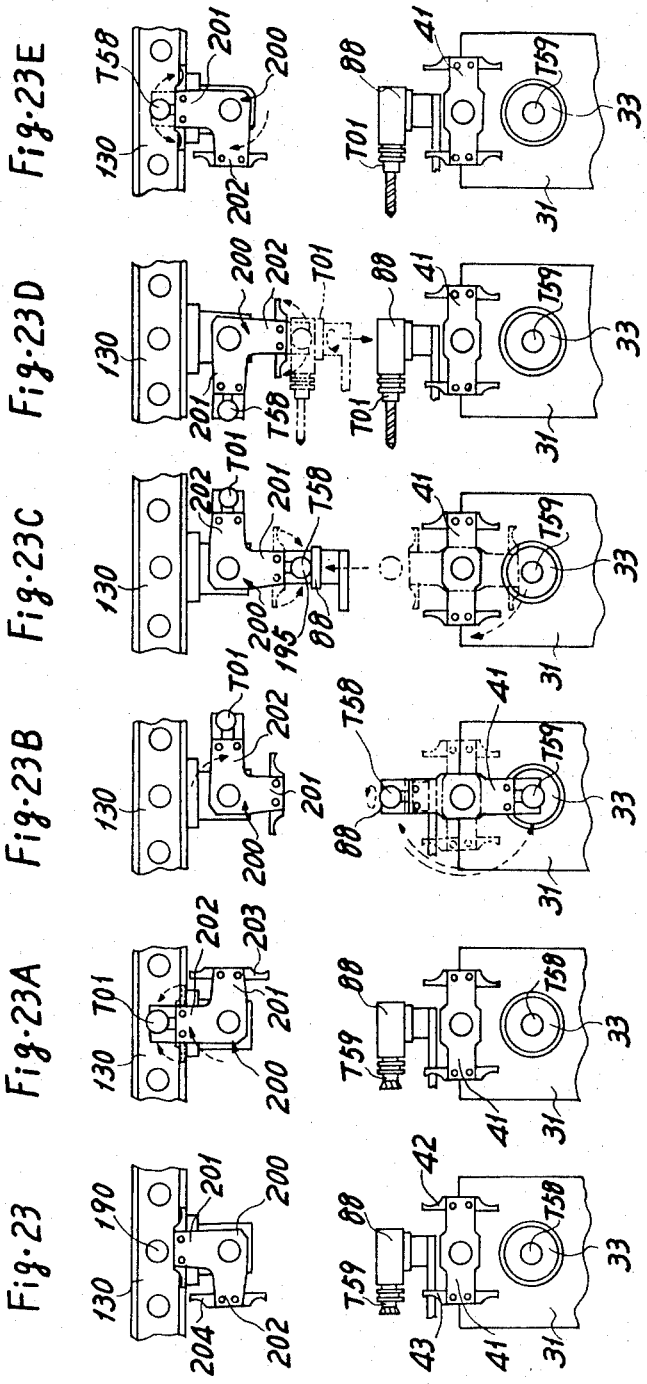

MACHINE TOOL WITH TOOL CHANGE DEVICE

BACKGROUND OF THE INVENTION

This invention relates to a machine tool provided with an automatic tool change device for interchanging a tool held in a spindle and a tool stored in a tool storage magazine for permitting the same to perform a variety of machining operations on a workpiece.

A conventional machine tool having an automatic tool change device usually includes an upstanding column mounted on a bed, and a spindle head receiving a spindle therein is slidably mounted thereon for vertical movement along the column. The spindle head carries a tool storage magazine which removably stores diverse tools for performing a variety of machining operations on a workpiece. The tool indexing operation for a tool change operation between the spindle and the tool storage magazine is generally performed during the machining operation and, therefore, vibration produced during the tool indexing operation is transmitted to the spindle, which results in a lower machining accuracy.

To meet this problem, consideration has been given to installing the tool storage magazine on a fixed portion of the machine, or the floor, in spaced relation with the bed carrying the upstanding spindle head-supporting column. In this case, the spindle head is moved to a position where the spindle is in a predetermined position relative to the tool storage magazine every time a tool change operation is performed, which effectively prevents the tool change from being carried out immediately after the machining operation, thereby requiring a longer period of time to effect the tool change operation and causing a lower machining efficiency.

Moreover, vertically moving the spindle head for making a tool change is likely to cause inaccuracy of concentricity of the bore being worked in a fine boring operation.

SUMMARY OF THE INVENTION

It is, therefore, an object of the present invention to provide a machine tool with an improved automatic tool change device comprising a carriage having a tool holding device movable between a spindle head supporting spindle and a tool storage magazine installed on the floor adjacent thereto in which diverse tools for performing a variety of machining operations on a workpiece are removably stored.

Another object of the present invention is to provide a workpiece machining apparatus with an automatic tool change device which is capable of exchanging a tool held in a spindle for a tool stored in a tool storage magazine without transmitting vibration to the spindle during operation thereof.

Still another object of the present invention is to provide an automatic tool changing device for use on workpiece machining apparatus which is capable of effecting tool changes automatically substantially without effecting the accuracy or efficiency of the machining operations.

The foregoing and other objects are attained by an automatic tool change device for workpiece machining apparatus which features a tool storage magazine installed on the floor adjacent the machine bed for removably storing diverse machine tools and a carriage having a tool holding device which follows the movement of a spindle head in which a spindle is received for maintaining a predetermined positional relationship therewith while a tool exchange between the spindle and the tool holding device is effected by a main transfer arm. The carriage, on the other hand, is moved independently of the spindle head to be maintained in a predetermined relation with respect to the tool storage magazine when a tool exchange between the tool holding device and the tool storage magazine is made by a sub-transfer arm during operation of the machine. In addition, the tool holding device is pivotally supported on the carriage so that it will not interfere with the workpiece during a machining operation.

DESCRIPTION OF THE DRAWINGS

Various other objects, features and attendant advantages of the present invention will be more fully appreciated as the same becomes better understood from the following detailed description of a preferred embodiment of the present invention when considered in connection with the accompanying drawings, in which like reference numerals designate like or corresponding parts throughout the several views thereof, and wherein:

FIGS. 23 to 23E, inclusive, are a series of schematic views illustrating the tool change operation.

DETAILED DESCRIPTION OF THE INVENTION

Figure 1:
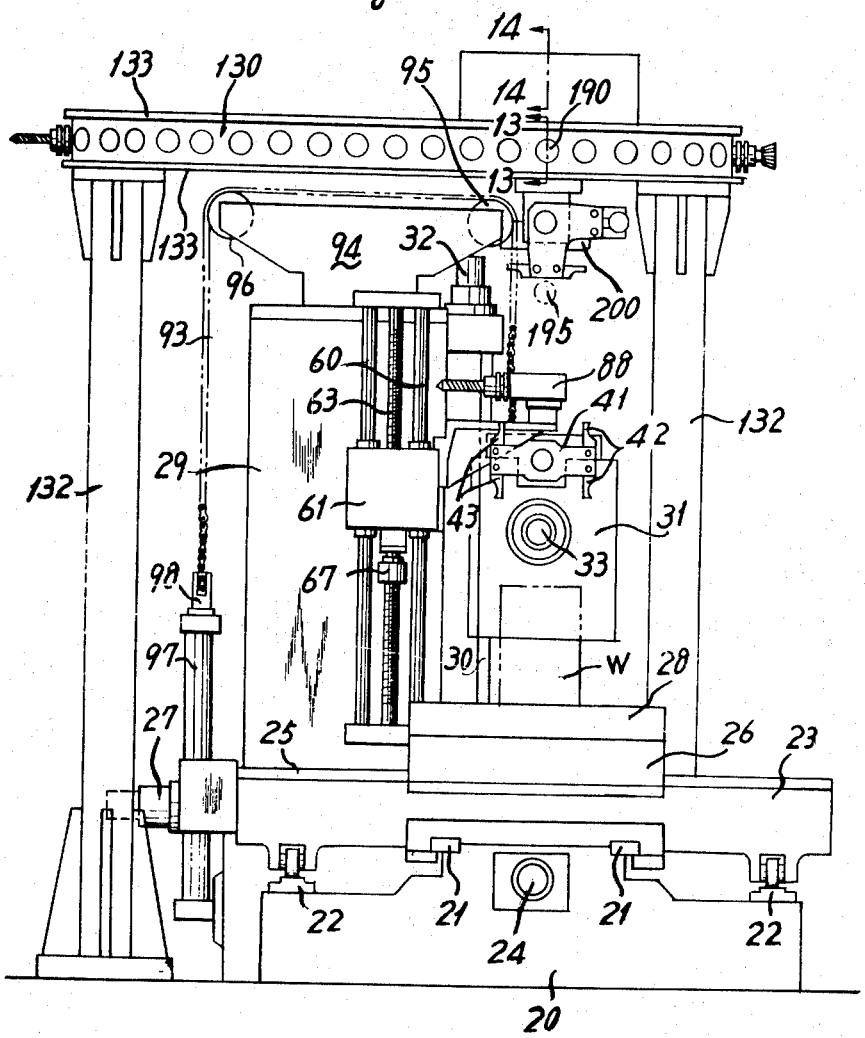
FIG. 1 is a front view of a machine constructed according to the present invention.
Figure 2:
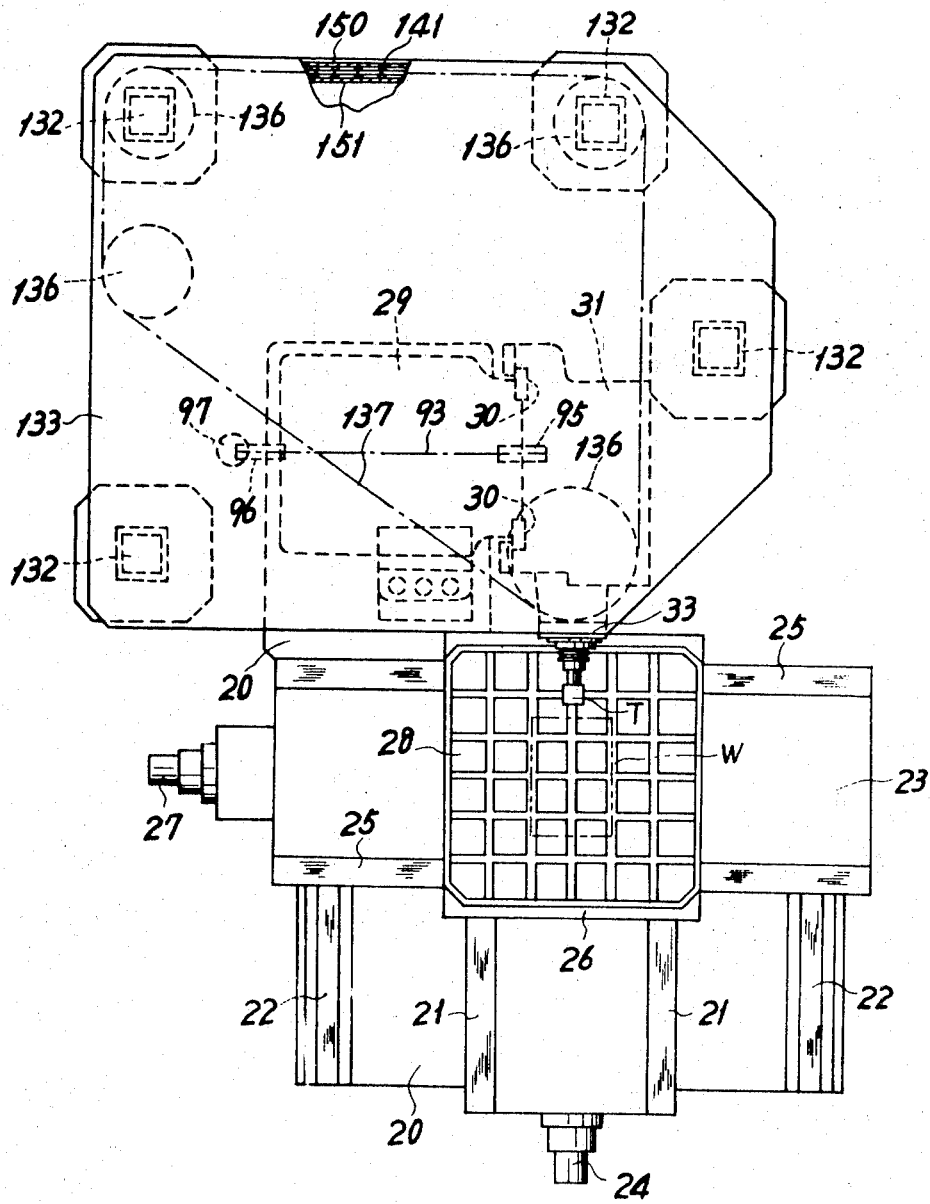
FIG. 2 is a plan view of the machine shown in FIG. 1.

Referring now to the drawings and more particularly to FIGS. 1 and 2, there is shown a bed 20 having an intermediate pair of parallel horizontal ways 21 and another pair of horizontal ways 22 disposed on opposite sides thereof for slidably supporting a saddle 23 which is adapted to be driven in a horizontal direction along the ways 21 and 22 by a motor 24 secured to the front side of the bed 20. The saddle 23 is provided with ways 25 extending transversely of ways 21 and 22 on the bed 20 for slidably supporting a cross table 6 which is adapted to be moved along the ways 25 in a direction perpendicular to the path of movement of the saddle 23 by a motor 27 secured to the left side of the saddle 23. Rotatably mounted on the cross table 26 is a rotary index table 28 which is adapted to support a workpiece W to be worked on.

On the rear end of the bed 20, there is mounted an upstanding column 29 having vertical ways 30 thereon for slidably supporting a spindle head 31 which is adapted to be moved in a vertical direction along the ways 30 by a motor 32 mounted on the top of the column 29. In the spindle head 31, there is rotatably mounted a spindle 33 into which a variety of tools T removably stored in a tool storage magazine 130 are adapted to be successively inserted for performing a machining operation on the workpiece W.

One end of a chain 93 is connected to the top surface of the spindle head 31, while the other end of the chain 93 is connected to a piston rod 98 of a hydraulic balancing actuator 97 secured to the left sides of the bed 20 and the column 29 through sprocket wheels 95 and 96 which are rotatably maintained by a support 94 mounted on the top surface of the column 29. The hydraulic balancing actuator 97 designed to balance the weight of the spindle head 31 to permit smooth, vertical sliding movement thereof.

With the arrangement described above, the spindle 33 and the workpiece W clamped on the rotary index table 28 may be mutually moved in three directions perpendicular to each other. Therefore, different machining operations may be successively applied on different working surfaces of the workpiece W by cooperation of relative movement between the spindle 33 and the workpiece, angular indexing of the rotary index table 28 and an automatic tool change operation, to be described hereinafter.

On the top front side of the spindle head 31, there is provided a main transfer arm 41 for replacing a previously used tool T in the spindle 33 with a new tool stored in a tool socket 88 on a carriage 61 for a succeeding machining operation. After the tool change operation between the tools respectively positioned in the spindle 33 and the tool socket 88 on the carriage 61 is performed, the carriage is moved upwardly, independent of the working operation of the tool that has been substituted in the spindle 33, to replace the used tool with a further one yet unused in the particular working operation which is selected from among a plurality of tools removably stored in the tool storage magazine 130 by means of a sub-transfer arm 200.

Referring now to FIGS. 3 through 6, the main transfer arm 41 will be described in detail. On the upper front surface of the spindle head 31, there is mounted a bracket 34 in which an operating shaft 35 is slidably and rotatably received in parallel relation with the axis of the spindle 33, the front end of the shaft 35 extending outwardly of the front end of the bracket 34. A piston 36 is secured to the rear end of the operating shaft 35 and is slidably received in a cylinder 37 formed in the bracket 34. The operating shaft 35 has formed thereon a gear 38 of relatively long axial length engaging a rack 39 formed on a piston 100 which extends transversely of the axis of the operating shaft 35 and is slidably received in a cylinder 40 formed in the bracket 34.

The main transfer arm 41 is secured to the front end of the operating shaft 35 and has pairs of pivotal grips 42 and 43 on longitudinally opposite ends thereof. The pair of grips 42 and 43 have sector gears 44 and 45 at the peripheries of the pivoted ends thereof, respectively. In the main transfer arm 41, there are provided cylinders 46 and 47 into which pistons 48 and 49 are respectively longitudinally slidably received. Piston rods 50 and 51 of the pistons 48 and 49 have on radially opposite sides racks 52 and 53 engaging the sector gears 44 and 45, respectively, to close or open the grips 42 and 43 upon actuation of the cylinders 46 and 47.

A distributing plate 56 adjacent to the main transfer arm 41 is rotatably mounted on the operating shaft 35. A guide shaft 57 is slidably received in a through bore of the bracket 34 in parallel relation with the operating shaft 35. One end of the guide shaft 57 extends outwardly of the one end of the bracket 34 and is secured to the distributing plate 56, while the other end thereof extends outwardly of the other end of the bracket 34 and receives therein, in telescopic relationship therewith, two stationary pipe lines 58 and 59 each being connected at one end thereof to a fluid supply source through a change-over valve (not shown). The stationary pipe lines 58 and 59 are respectively connected at the other ends thereof to passages 54 and 55 opening into head ends and rods ends of the cylinders 46 and 47, respectively, through passages formed in the guide shaft 57 and the distributing plate 56. With the arrangement described above, the cylinders 46 and 47 may be actuated in any axial and rotational position of the operating shaft 35.

Figure 3:
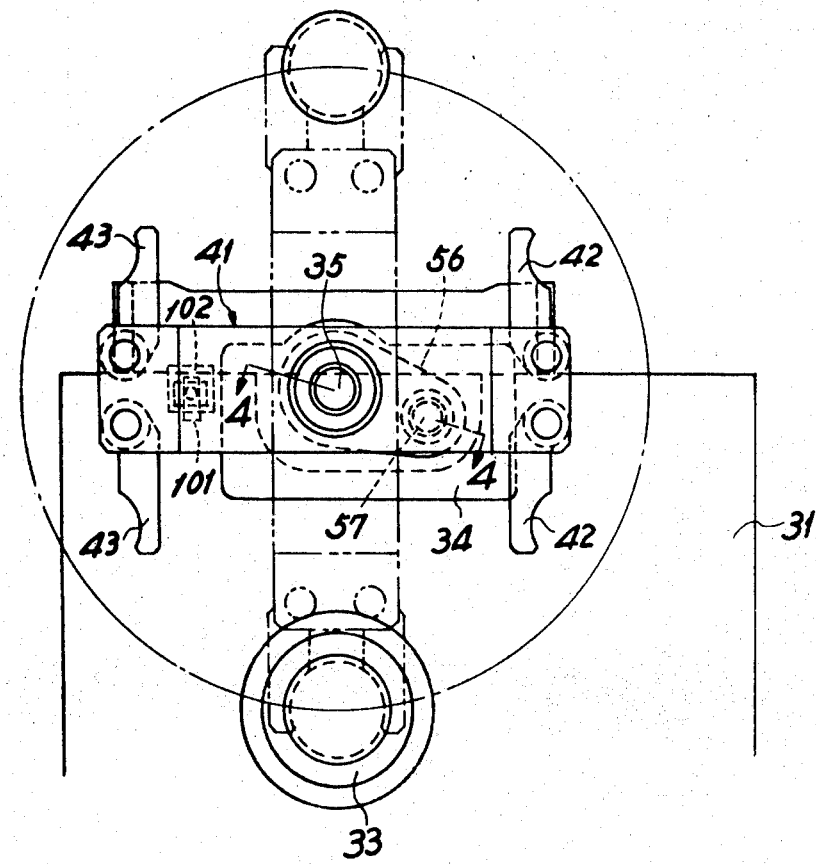
FIG. 3 is a detail fragmentary front view of a main transfer arm shown in FIG. 1.
Figure 4:
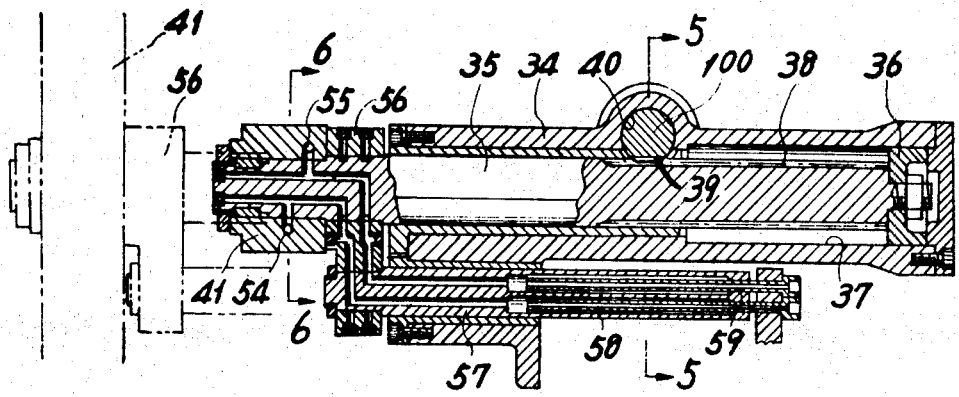
FIG. 4 is a sectional view taken along the line 4—4 of FIG. 3.
Figure 5:
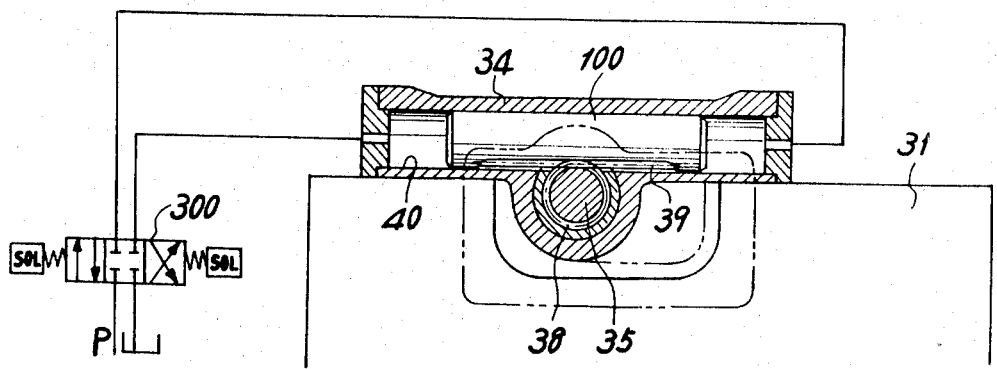
FIG. 5 is a sectional view taken along the line 5—5 of FIG. 4.
Figure 6:
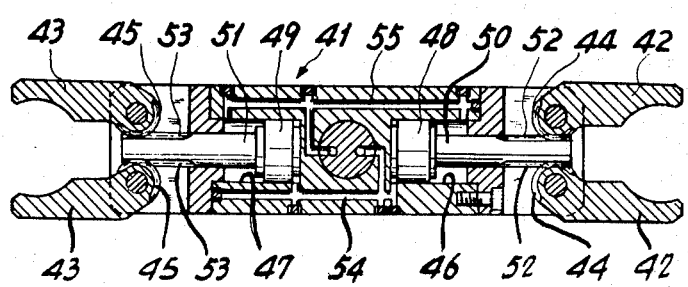
FIG. 6 is a sectional view taken along the line 6—6 of FIG. 4.

The piston 100 is normally held in a neutral position, as shown in FIG. 5, so that the main transfer arm 41 is held in the horizontal position shown in solid line in FIG. 3. In this horizontal position of the main transfer arm 41, the pistons 48 and 49 of the cylinders 46 and 47 are moved outwardly by means of fluid pressure supplied in the passage 54, so that each pair of grips 42 and 43 are opened, or released. When the machining operation is completed by the tool in the spindle 33, the piston 100 is moved to the right, as viewed in FIG. 5, by means of the pressure fluid, so that the main transfer arm 41 is turned clockwise by 90° from the horizontal position to a vertical position to perform the tool change operation between the tools in the spindle 33 and the tool socket 88 on the carriage 61. Then the grips 42 and 43 are closed to grasp the tools in the spindle and the tool socket, as shown in dotted line in FIG. 3. The operating shaft 35 is then advanced longitudinally by actuation of the cylinder 37 to the position shown in dotted line in FIG. 4, to extract the tools from the spindle 33 and the tool socket 88. In the advanced position of the operating shaft 35, the gear 38 of the operating shaft 35 is also maintained in engagement with the rack 39 of the piston 100 because of the relatively axially long teeth thereof. When the piston 100 is moved to the left to the full extent permitted, the main transfer arm 41 is turned counterclockwise by 180° to replace or interchange the tools.

Then, the cylinder 37 is actuated to insert the interchanged tools into the spindle and the tool socket, and thereafter the grips 42 and 43 are opened. The cylinder 40 is thereafter actuated to move the piston 100 to the right to turn the main transfer arm 41 clockwise by 90° to locate it in the original horizontal position thereof.

In order to confirm the proper horizontal disposition of the main transfer arm 41, a dog 101 secured to the main transfer arm 41 actuates a limit switch 102 secured to the front of the spindle head 31. The actuation of the limit switch 102 causes a change-over valve 300, shown in FIG. 5, to block the cylinder 40 to maintain the horizontal location of the main transfer arm 41 during the machining operation. When the main transfer arm 41 is turned counterclockwise by 180°, the limit switch 102 is not actuated by the dog 101 because of the advanced position of the main transfer arm 41.

The operation of the main transfer arm 41 described hereinbefore performs the tool change operation between the tool held in the spindle 33 and the tool held in the tool socket 88 on the carriage 61 which is capable of following the movement of the spindle head 31 in predetermined positional relationship therewith, as described hereinafter.

Figure 7:
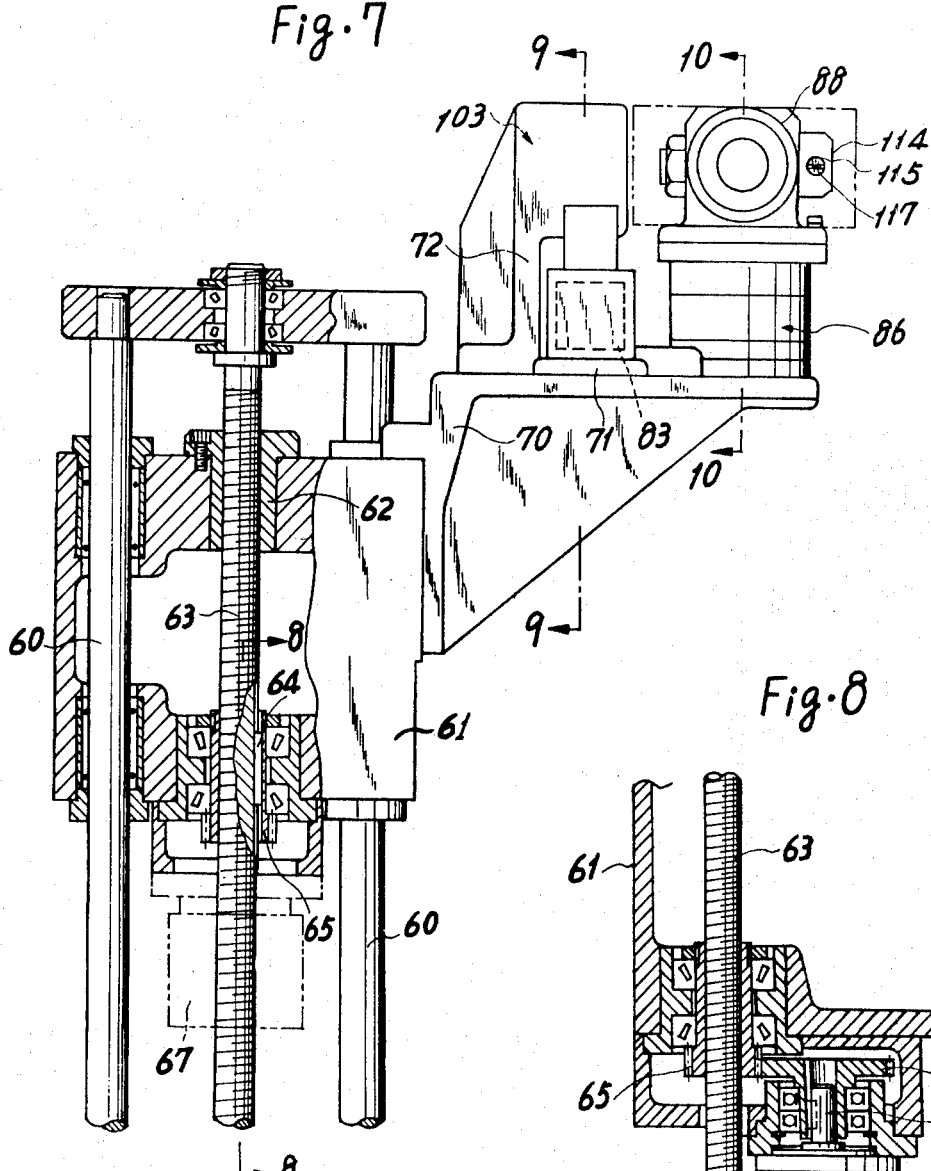
FIG. 7 is a detail fragmentary front view, partly in section, of a carriage shown in FIG. 1.
Figure 8:
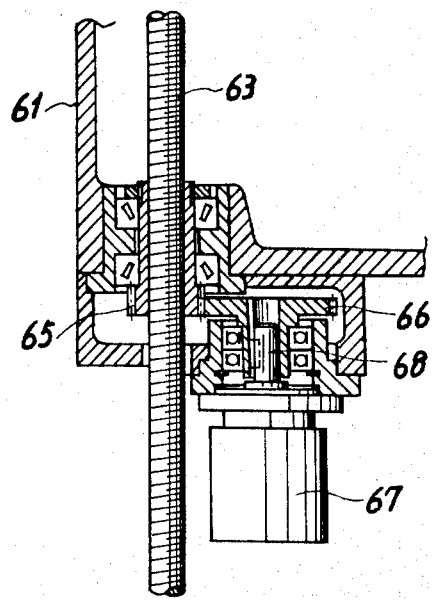
FIG. 8 is a sectional view taken along the line 8—8 of FIG. 7.

Referring to FIG. 7, the carriage 61 is guided by two parallel guide shafts 60 vertically disposed in front of the column 29. On the top of the carriage 61, there is secured a nut 62 which is threadedly engaged with a feed screw 63 rotatably supported in the column 29 in parallel relation with the guide shafts 60. At the bottom of the carriage 61 there is rotatably journalled a gear 65 which is slidably but non-rotatably mounted on the feed screw 63 through a key 64. As shown in FIG. 8, the gear 65 engages a complementary gear 66 connected to an output shaft 68 of a hydraulic motor 67 secured to the bottom of the carriage 61. The hydraulic motor 67 is connected to the fluid supply source through a servo valve device 103 to be described hereinafter. Rotation of the output shaft 68 of the hydraulic motor 67 by operation of the servo valve device 103 causes rotation of the feed screw 63 to move the carriage 61 along the guide shafts 60 in a vertical direction by means of the threaded engagement between the feed screw 63 and the nut 62.

The carriage 61 is provided with the pivotal tool socket 88 for replacing the used tool in the spindle 33 by a tool held therein, the servo valve device 103 being operative to cause the carriage 61 to follow the spindle head 31 and a solenoid 83 being provided for rendering the follow motion of the carriage 61 inoperative. To this end, the carriage 61 has secured thereto a supporting bracket 70 on which are mounted a bracket 71 for the solenoid 83 and a housing 72 for the servo valve device 103, best shown in FIG. 9. A control link 73 in the form of a bell crank arm is pivotally supported on the upper end portion of the bracket 71. In the housing 72 is secured a valve sleeve 74 having therein a vertical blind bore in which a servo spool 75 is slidably received. The lower end of the servo spool 75 bears against the upper surface of one leg of the control link 73 under the biasing force of a compression spring 76 disposed between the upper end of the servo spool 75 and the blind bore of the valve sleeve 74. The servo spool 75 has three axially spaced land portions separated by two reduced portions. The intermediate land portion opposes a supply port 77, the upper and lower land portions oppose exhaust ports 78, and the upper and lower reduced portions oppose control ports 79 and 80, respectively, which are connected with supply-exhaust ports of the hydraulic motor 67. An abutment 85 secured on a bracket mounted on the spindle head 31 opposes the lower surface of the one leg of the control link 73.

Figure 9:
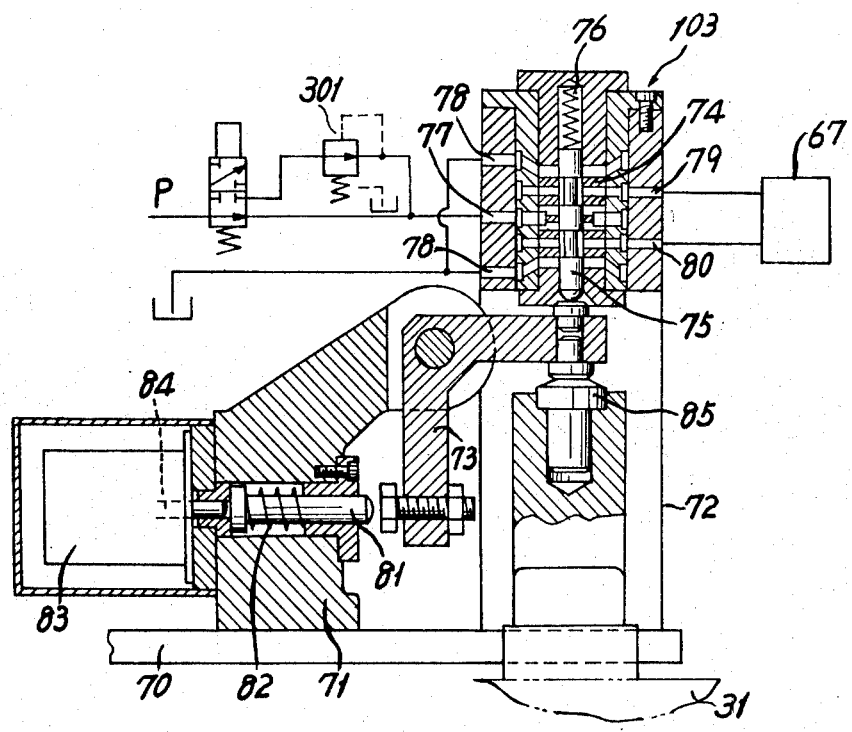
FIG. 9 is a sectional view taken along the line 9—9 of FIG. 7.
Figure 10:
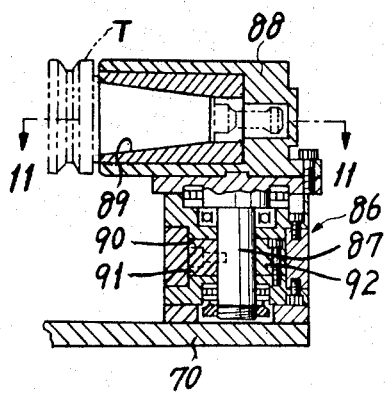
FIG. 10 is a sectional view showing a tool carrying socket on the carriage taken along the line 10—10 of FIG. 7.

With this arrangement, during the follow motion of the carriage 61, the abutment 85 bears against the lower surface of the control link 73 and the lower end of the servo spool 75 bears against the upper surface of the control link 73 under the force of the compression spring 76, so that the servo spool 75 is moved vertically in response to the movement of the spindle head 31. In the neutral position of the servo spool 75, as illustrated in FIG. 9, the supply and exhaust ports 77 and 78 are blocked by the land portions of the servo spool 75. When the servo spool 75 is moved downwardly in response to the downward movement of the spindle head 31, the fluid communications between the supply port 77 and the control port 79, and between the lower exhaust port 78 and the control port 80 are established so that the hydraulic motor 67 is actuated to rotate the output shaft 68 thereof in one direction to shift the carriage downwardly and to thereby follow the downward movement of the spindle head 31, thereby to maintain the servo spool 75 in a neutral position.

On the other hand, when the servo spool 75 is moved upwardly from the neutral position in response to an upward movement of the spindle head 31, the fluid communications between the supply port 77 and the control port 80, and between the upper exhaust port 78 and the control port 79 are established so that the hydraulic motor 67 is actuated to rotate the output shaft 68 thereof in a reverse direction to shift the carriage 61 upwardly and thus to follow the upward movement of the spindle head 31, thereby to continuously maintain the servo spool 75 in its neutral position. Consequently, the carriage 61 automatically follows the vertical movement of the spindle head 31.

In the bracket 71 is slidably received a push shaft 81 which opposes the other leg of the control link 73. The push shaft 81 is forced by a compression spring 82 into a position where the push shaft 81 disengages from the other leg of the control link 73. The solenoid 83 adjacent to the push shaft 81 is secured to the bracket 71.

The movable iron core 84 of the solenoid 83 is adapted by energization of the solenoid 83 to move the push shaft 81 into engagement with the other leg of the control link 73 against the force of the spring 82. The movement of the push shaft 81 against the spring 82 causes counterclockwise rotation of the control link 73 to shift the servo spool 75 upwardly and to disengage the control link 73 from the abutment 85, whereby the carriage 61 is moved upwardly independent of the movement of the spindle head 31 to locate the tool socket 88 in a tool change position 195 as shown in FIG. 1, where a tool change operation between the tool held in the tool socket 88 on the carriage 61 and the tool grasped by the sub-transfer arm 200 is performed.

Just before the tool socket 88 reaches the tool change position 195, the supply fluid pressure in the supply 77 of the servo valve device 103 is reduced by a pressure reducing valve 301, shown in FIG. 9, to lower the torque produced by the hydraulic motor 67, thereby to reduce the speed of the upward movement of the carriage 61. Thus, when the carriage 61 is moved into engagement with a positive stop, not shown, to locate the tool socket 88 in the tool change position 195, the locked engagement between the feed screw 63 and the nut 62 is presented through the reduced torque produced to the hydraulic motor 67. In the tool change position 195, the used tool in the tool socket 88 is replaced by a new one to be used for a succeeding working operation and is returned back into the tool storage magazine 130 by means of the sub-transfer arm 200, described hereinafter. When the new tool is inserted into the tool socket 88, the solenoid 83 is deenergized to permit the carriage 61 to follow the movement of the spindle head 31.

The tool socket 88 is fixedly secured on a rotary table or shaft 87 which is rotatably journalled on a supporting block 86 mounted on the supporting bracket 70. The tool socket 88 has therein a tapered bore 89 for receiving the tool T. In the supporting block 86 there is provided a hydraulic rotary cylinder 90 which accommodates a rotatable member 91 secured to the rotary shaft 87. The rotary member 91 is moved into engagement with either side of a stationary member 92 secured to the supporting block 86 by the actuation of the rotary cylinder 90 so that the tool socket 88 may be turned 90° in either direction. When the tool socket 88 is turned to an operative position in parallel relation with the spindle 33, the axis of the tapered bore 89 is adapted to be positioned in a plane containing the axes of the operating shaft 35 of the main transfer arm 41 and the spindle 33 so as to perform the tool change operation between the tools in the spindle 33 and the tool socket 88.

During a machining operation, the tool socket 88 is maintained in an inoperative position where the axis thereof is at right angles with the axis of the spindle 33. When the tool socket 88 is positioned in the inoperative position, the tool T held in the tool socket 88 does not interfere with the workpiece W in any operative position of the spindle 33 relative to the workpiece W. Thus, it is very effective to maintain the tool socket 88 in the inoperative position, when a large size workpiece is being worked on.

After a particular machining operation by the tool positioned in the spindle 33 has been completed, the tool socket 88 is turned by 90° into the operative position and the tool change operation between the tools in the spindle and the tool socket, as previously described, is performed without moving the spindle head 31 vertically.

The tool socket 88 is provided with a holding device 104 which serves to hold and release the tool T from the tool socket 88 in cooperation with the grips 42 and 43 of the main transfer arm 41 and grips 203 and 204 of the sub-transfer arm 200, as hereinafter described. The holding device 104 has a pair of plungers 106 and 107 which are adapted to resiliently hold a draw-in bolt 105 provided on the shank of the tool T. The plungers 106 and 107 are slidably inserted into a bore 108 radially perforated in the rear end portion of the tool socket 88 in a horizontal plane such that they are urged inwardly with respect to each other by compression springs 109 and 110.

Figure 11:
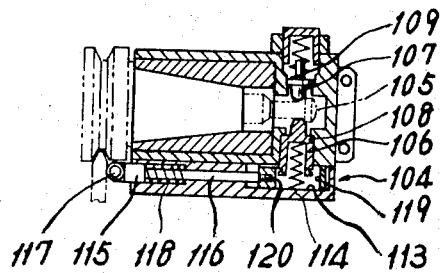
FIG. 11 is a sectional view taken along the line 11—11 of FIG. 10.
Figure 12:
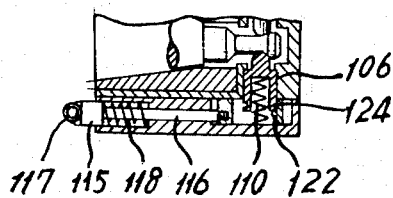
FIG. 12 is a partial sectional view of the tool socket on the carriage, showing a locked engagement of a tool.

A block 114 is secured to the side of the tool socket 88 and has a longitudinal bore 113 therein. A rod 116 is slidably received in the bore 113 of the block 114 in parallel relation with the axis of the tool socket 88 and has an enlarged portion 115 at the front end thereof. A roller 117 is rotatably received at the front end of the enlarged portion 115 and is adapted to be engaged by the grip. A compression spring 118 is seated between the shoulder of the enlarged portion 115 and a stepped end of the bore 113 to urge the rod 116 outwardly of the block 114. The other end of the rod is threadedly engaged with a latch member 119 slidably received in the bore 113 of the block 114. The latch member 119 has an elongated vertically oriented bore 120 for receiving the plunger 106. An arcuate projection 122 is provided at the inner periphery of the elongated bore 120. When the tool is inserted into the tool socket 88, the arcuate projection 122 abuts the bottom surface of the plunger 106, as sown in FIG. 12, to prevent the rearward movement of the plunger 106. When the tool held in the tool socket 88 is grasped by the grips, the roller 117 is engaged by the grip so that the rod 116 is urged inwardly against the force of the spring 118 to release the engagement between the projection 122 and the plunger 106, as shown in FIG. 11. Thus, the tool is permitted to be moved outwardly by the grips and the tool may be drawn out from the tool socket 88 against the springs 109 and 110.

While the tool is being drawn out from the tool socket 88, the plunger 106 is moved downward against the spring 110. Thus, with the completion of draw-out of the tool from the tool socket 88, an annular groove 124 in the plunger 106 receives the arcuate projection 122 to prevent the plunger 106 being returned under the force of the spring 110. This is effective when the tool is adapted to the inserted into the tool socket 88. It is preferable to arrange the enlarged portion 115 of the rod 116 in a position shown in FIG. 7 so that the roller 117 is engaged by the main transfer arm 41 and the sub-transfer arm 200.

Figure 13:
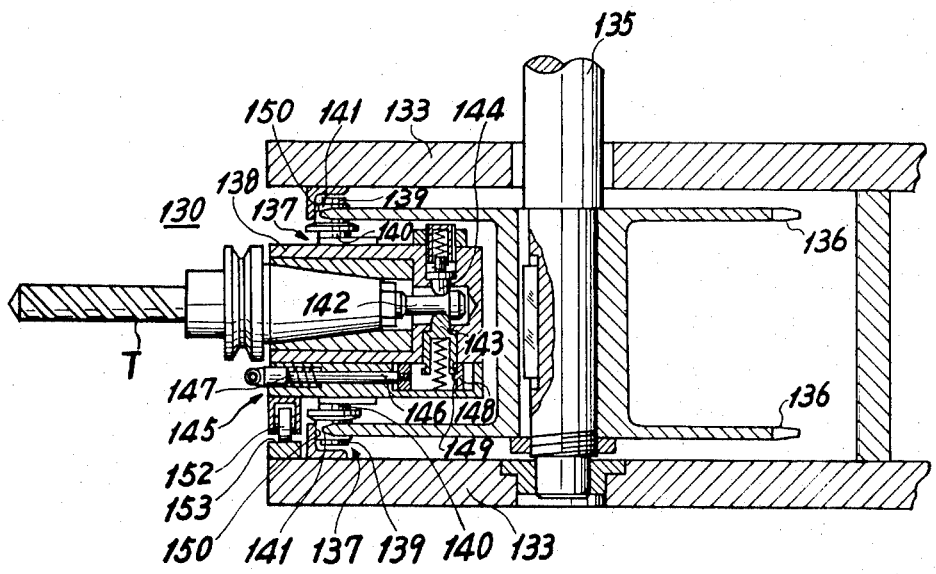
FIG. 13 is a detail sectional view of a tool storage magazine taken along the line 13—13 of FIG. 1.

The tool storage magazine 130 and the sub-transfer arm 200 are mounted on parallel base plates 133 supported above the column 29 by upstanding brackets 132 which are installed on the floor in spaced relation with the bed 20. As shown in FIG. 13, the tool storage magazine 130 comprises upper and lower flexible endless chains 137 driven by means of sprocket wheels 136, each sprocket wheel being rotatably mounted in the base plates 133. Each of the chains 137 comprises pins 139 fixed on upper and lower surfaces of each of the tool sockets 138 and link plates 140 connected by the pins 139 and chain rollers 141 rotatably mounted on the pins 139. Each sprocket wheel 136 is adapted to engage the chain rollers 141 of one of the chains. In this embodiment, sixty tool sockets 138 are disposed at an equal distance with respect to each other by the link plates 140 so as to store a variety of tools. Each tool socket 138 has the same construction as that of the tool socket 88 on the carriage 61 with respect to a tool holding device. Thus, each tool socket 138 is provided with a pair of plungers 143 and 144 adapted to be resiliently engaged with a drawin bolt 142, and a holding device 145 cooperating with the plunger 143 for preventing the tool from falling off. Similar to the tool socket 88, the holding device 145 has a slidable rod 146, a spring 147, a latch member 148, an arcuate projection 149 and the like.

Outer guide rails 150 and inner guide rails 151 shown in FIG. 2, are provided on the base plates 133 for guiding the chain rollers 141 on the upper and lower surfaces of each tool socket 138 to increase the positioning accuracy and stability. The lower base plate 133 has thereon a guide rail 153 for guiding a roller 152 rotatably secured to the lower surface of each tool socket 138 to support the weight of each tool socket 138.

The tool storage magazine 130 has a tool change position 190 in alignment with the axis of the spindle 33 and the rotary center of the main transfer arm 41 and where the tool change operation between the tool held in the tool socket 138 of the magazine 130 and the tool grasped by the sub-transfer arm 200 is performed. As shown in FIG. 2, one of the sprocket wheels 136 engages the chains 137 at the tool change position 190 to prevent index error due to stretch or looseness of the chains 137.

Figure 15:
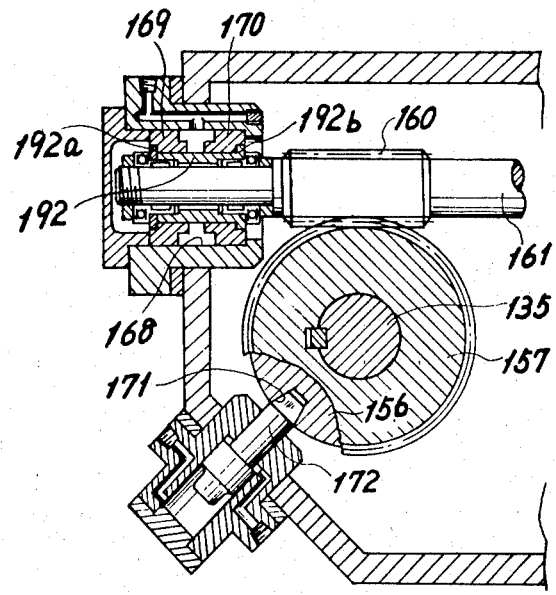
FIG. 15 is a sectional view taken along the line 15—15 of FIG. 14.
Figure 14:
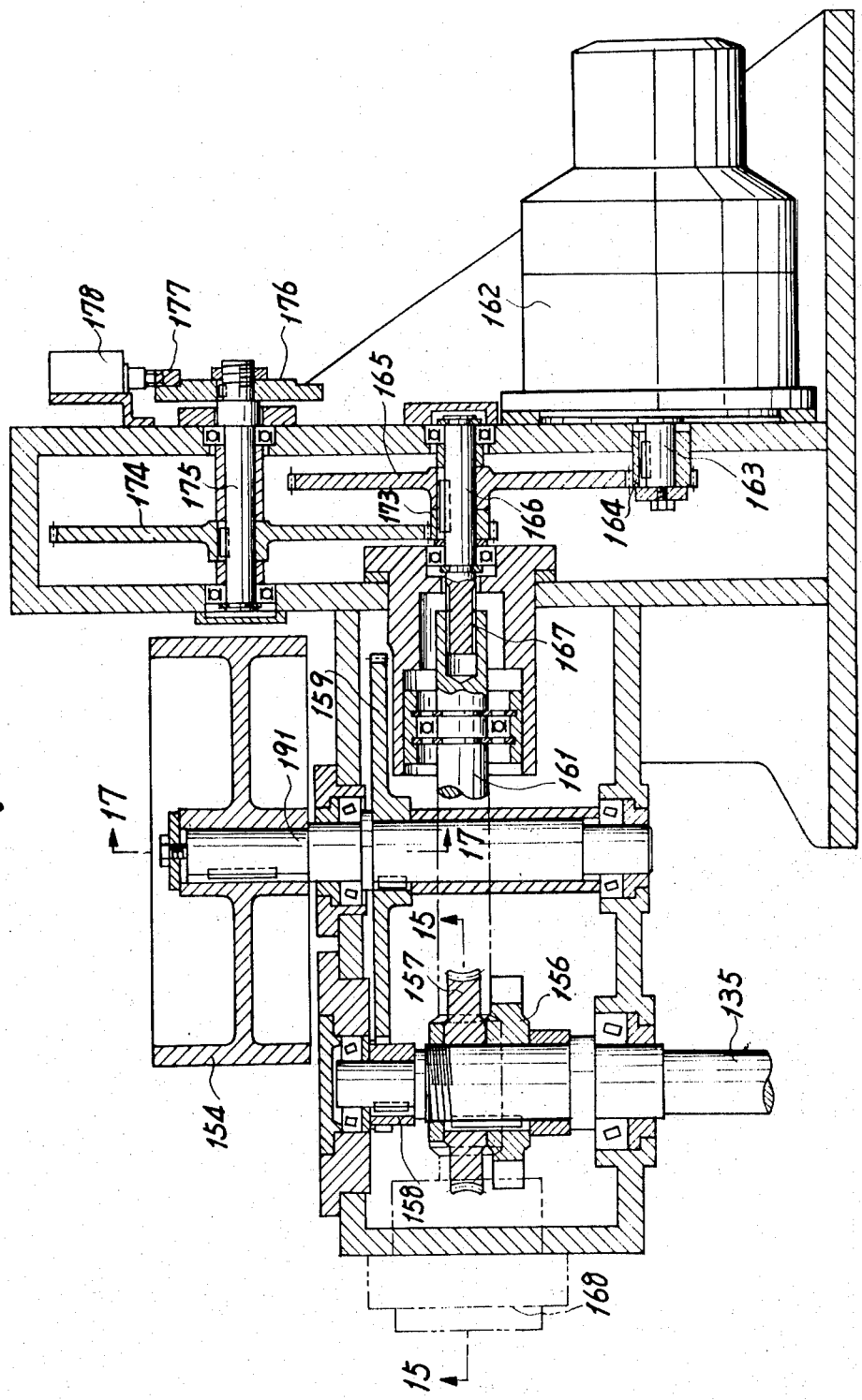
FIG. 14 is a detail sectional view showing a drive mechanism for the tool storage magazine, taken along the line 14—14 of FIG. 1.
Figure 16:
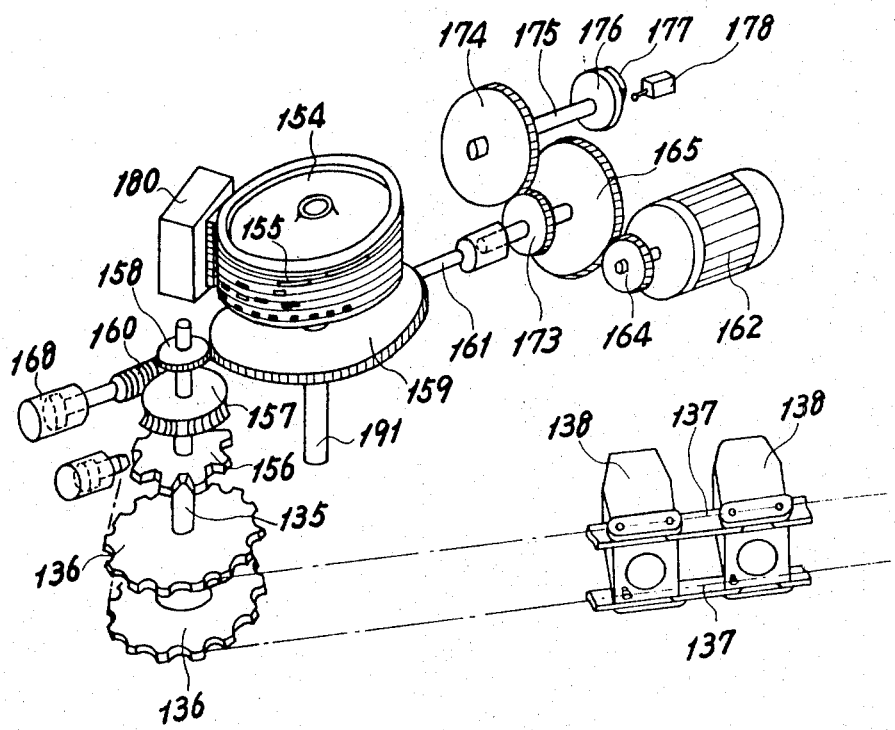
FIG. 16 shows a mechanical connection of the drive mechanism shown in FIGS. 14 and 15.

Referring to FIGS. 14 to 16, the tool indexing mechanism will be described. The sprocket wheel 136 having the tool change position 190 is secured on a vertical shaft 135, rotatably mounted in the base plates 133, in coaxial relation with an indexing plate 156, a worm wheel 157 and a gear 158. The gear 158 engages a relatively large gear 159 secured on a rotary shaft 191 of a coding drum 154 for selecting the desired tool from a plurality of tools stored in the tool sockets 138 of the tool storage magazine 130 in such a manner that when the tool storage magazine 130 is rotated one revolution, the coding drum 154 is rotated one revolution. The worm wheel 157 engages a worm 160 formed on a shaft 161, one end thereof being connected to a shaft 166 through a splined engagement indicated at 167 for axial movement relative thereto. The shaft 166 has keyed thereto a gear 165 in engagement with a gear 164 which is keyed to an output shaft 163 of a motor 162. The other end of the shaft 161 is rotatably connected to a sleeve 192 having shoulder portions 192a and 192b respectively engaging a pair of pistons 169 and 170 of a thrust damping cylinder 168. Pressure fluid is admitted between the pistons 169 and 170 to hold the shaft 161 in position under a normal drive of the sprocket wheel 136. The shaft 161 is permitted to move axially when thrust force above the fluid pressure is applied thereon. This arrangement is effective when a locating pin 172 is moved into engagement with recess 171 formed on the periphery of the indexing plate 156 to compensate for a slight angular position of the sprocket wheel 136 in an indexing operation of the tool storage magazine 130. The shaft 166 has keyed thereto a gear 173 engaging a gear 174 keyed to a shaft 175. The shaft 175 carries at one end thereof a circular plate 176 on which a dog 177 is angularly adjustably mounted. The dog 177 is adapted to actuate a limit switch 178 every time the tool storage magazine 130 is rotated by one pitch or the distance between the centers of adjacent two tool sockets 138. To this end, the gear ratio between gears 173 and 174 is determined in such a manner that the gear 174 is rotated one revolution when the tool storage magazine 130 is rotated by one pitch.

Figure 17:
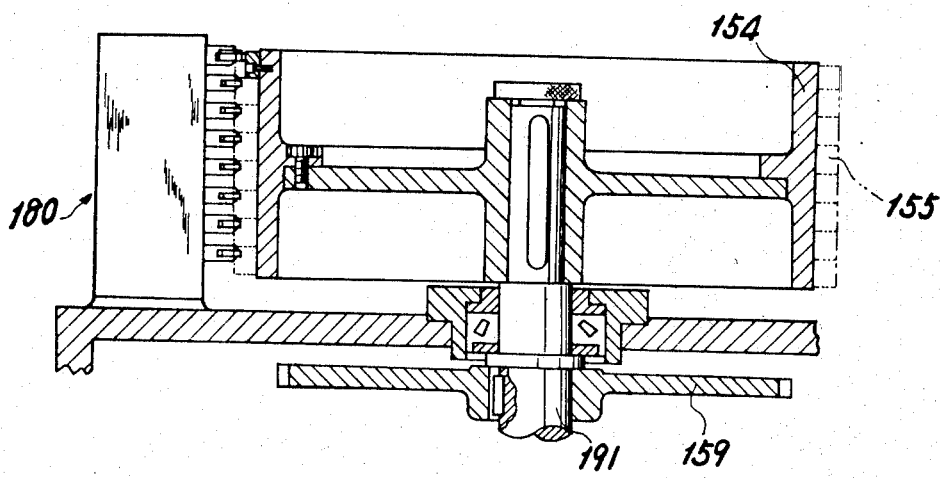
FIG. 17 is a sectional view showing a coding drum and a reading device therefor, taken along the line 17—17 of FIG. 14.
Figure 18:
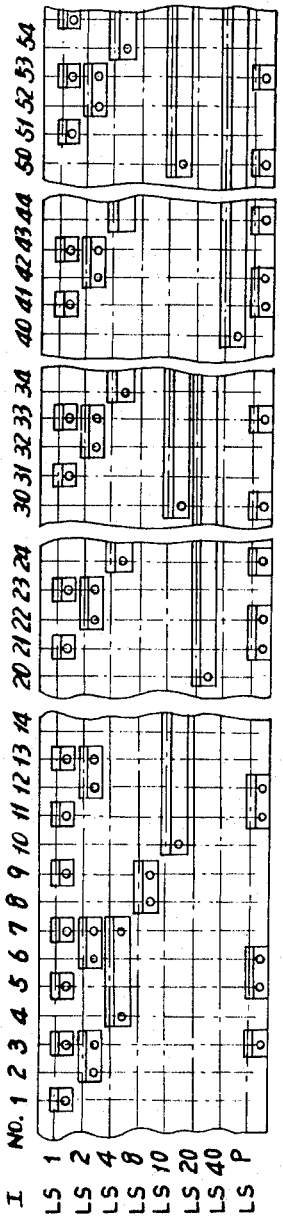
FIG. 18 shows a development of the coding drum on which a plurality of dogs are arranged to discriminate a variety of tools stored in tool sockets on the tool storage magazine.
Figure 19:
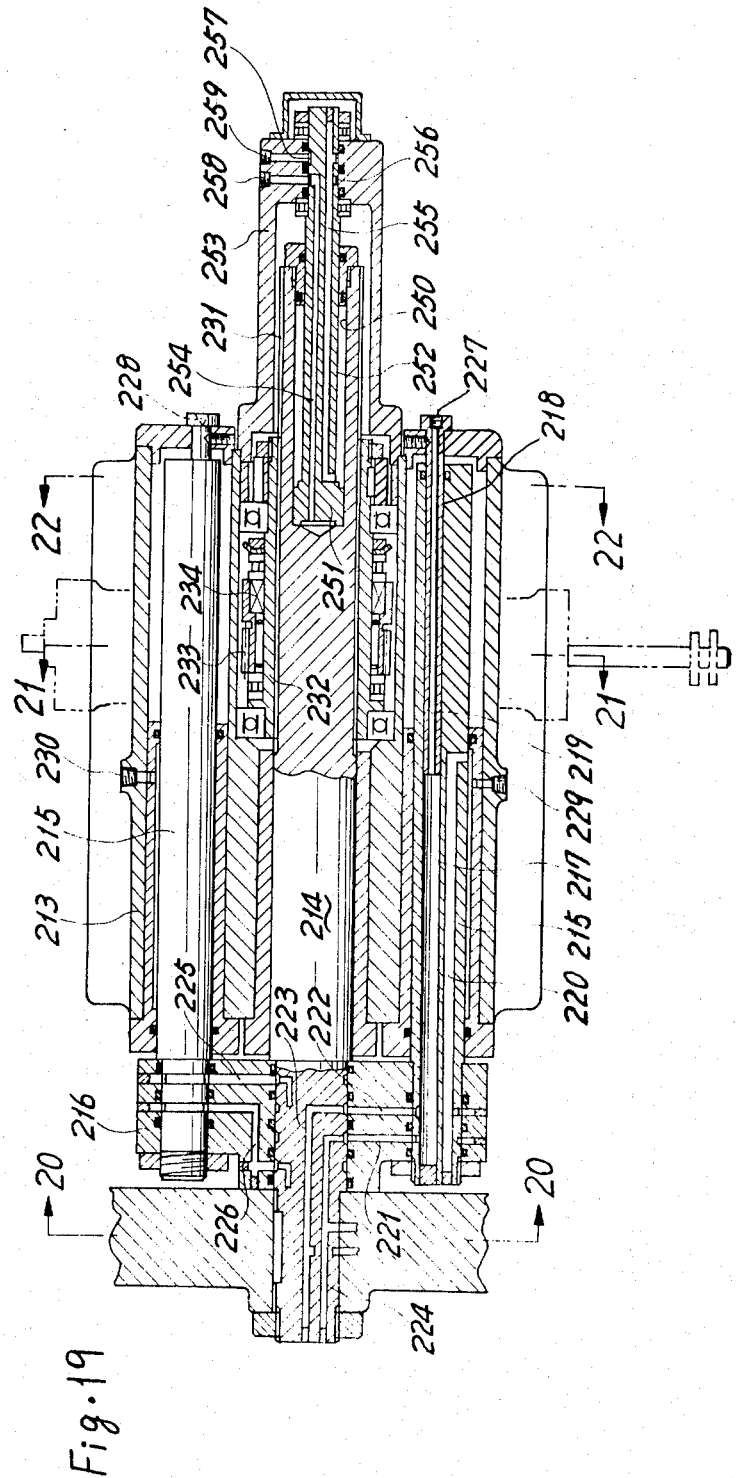
FIG. 19 is a detail longitudinal sectional view showing a sub-transfer arm shown in FIG. 1.
Figure 20:
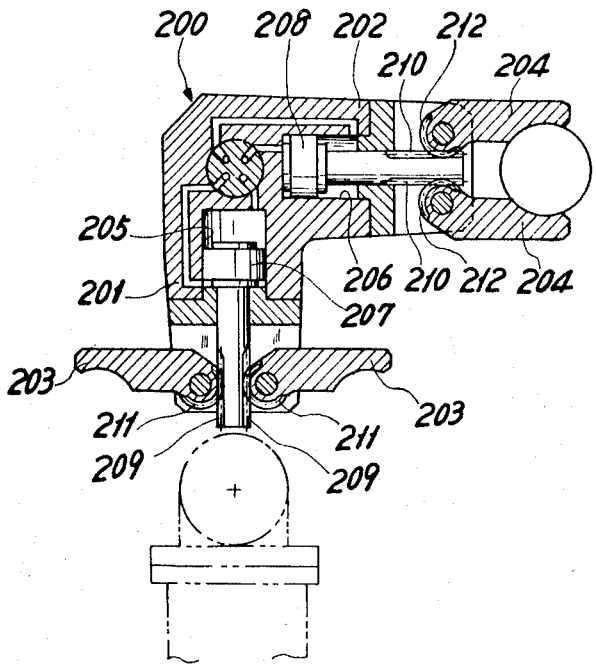
FIG. 20 is a sectional view taken along the line 20—20 of FIG. 19.

As shown in FIGS. 17 and 18, the coding drum 154 has on its periphery surface a series of dogs 155 based on a binary coded decimal and adapted to actuate a series of limit switches arranged on a reading device 180 to index the desired tool socket 138 to the tool change position 190. When the desired tool socket approaches the tool change position, the particular coding dogs on the coding drum 154 actuate the associated limit switches to produce a signal in coincidence with a designated tool coding signal preset by a tape command of an electric control system, not shown. With the product of the coincidence signal together with the actuation of the limit switch 178 by means of the dog 177, the locating pin 172 is moved toward the periphery of the indexing plate 156 and the motor 162 is reduced in speed. When the desired tool socket designated by the tape command is positioned in the tool change position 190, the locating pin 172 is moved into engagement with the recess 171 of the indexing plate 56 to index the sprocket wheel 136. A limit switch, not shown, confirming the engagement of the locating pin 172 within the recess 171 serves to brake the motor 162 to stop it. The worm 160 is effectively moved axially by means of the damping cylinder 168 during the time between engagement of the locating pin 172 within the recess 171 and the stopping of the motor 162.

As described above, the desired tool socket may be indexed to the tool change position 190 by means of the tape command.

The sub-transfer arm 200 for replacing the tool held in the tool socket 88 on the carriage 61 with the tool held in the tool socket 138 indexed to the tool change position 190 is disposed directly below the tool change position 190. The sub-transfer arm 200 has two arms 201 and 202 formed in an L-shaped configuration. As in the case of the main transfer arm 41, the arms 201 and 202 have respectively formed therein cylinders 205 and 206 in which pistons 207 and 208 are respectively slidably received. The rods of the pistons 207 and 208 have pairs of racks 209 and 210, respectively disposed on diametrically opposed sides thereof, which engage sector gears 211 and 212 formed on grips 203 and 204 pivotally mounted on the top ends of the arms 201 and 202, respectively, thereby effecting opening and closing of the grips 203 and 204.

The sub-transfer arm 200 is secured on an operating shaft 214 which is rotatably and slidably received in a housing 213 secured to the base plate 133. Two guide shafts 215 are slidably received in the housing 213, the guide shafts 215 being connected at one end to a bracket 216 which is rotatably mounted on the operating shaft 214. One of the guide shafts 215 has therein an axial through bore 217 in which one end of a pipe line 218 is slidably received, the other end of the pipe line 218 being secured to the housing 213, thereby to constitute a passage 219. Another axial passage 220 is provided in the one guide shaft 215. These passages 219 and 220 are connected to the cylinder 205 for the grips 203 through conduits 221 and 222 formed in bracket 216 and conduits 223 and 224 formed in the operating shaft 214. The other guide shaft 215 has two passages similar to the passages 219 and 220, which are connected to the cylinder 206 for the grips 204 through conduits 225 and 226. These two sets of passages are connected to the supply source through end supply ports 227, 228 and radial ports 229, 230 and are so arranged that the grips 203 and 204 are individually operated in any axial and angular position of the arms 201 and 202. The arm 201 is used only for replacing the used tool held in the socket 88 on the carriage in its original tool socket 138 in the tool change position 190 of the magazine 130. On the other hand, the arm 202 is used only for carrying out the succeeding tool from the magazine 130 to insert it into the tool socket 88 on the carriage 61.

Figure 21:
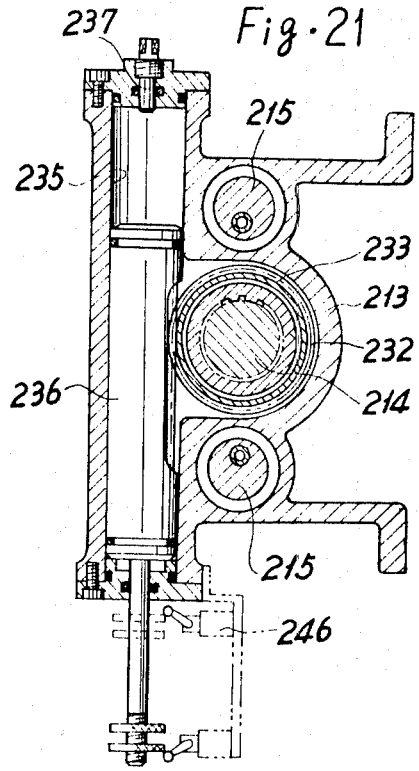
FIG. 21 is a sectional view taken along the line 21—21 of FIG. 19.

The rear portion of the operating shaft 214 is formed with a male spline 231 which engages a female spline formed in a sleeve 232 rotatably journalled thereabout in the housing 213. A pinion 233 is rotatably mounted on the sleeve 232. A one way clutch 234 for transmitting a rotation only in one direction is interposed between the pinion 233 and the sleeve 232. As shown in FIG. 21, the pinion 233 engages a rack piston 236 slidably mounted in a cylinder 235 formed in the housing 213. The upward movement of the rack piston 236 serves to rotate the sub-transfer arm 200 by 90° through pinion 233, one way clutch 234, sleeve 232 and the operating shaft 214. An adjusting member 237 threaded into the upper end of the cylinder 235 serves to limit the uppermost position of the rack piston 236 to rotate the sub-transfer arm by 90°. When the rack piston 236 is moved downward to rotate the pinion 233, the sleeve 232 is prevented from being rotated by operation of the one way clutch 234.

Figure 22:
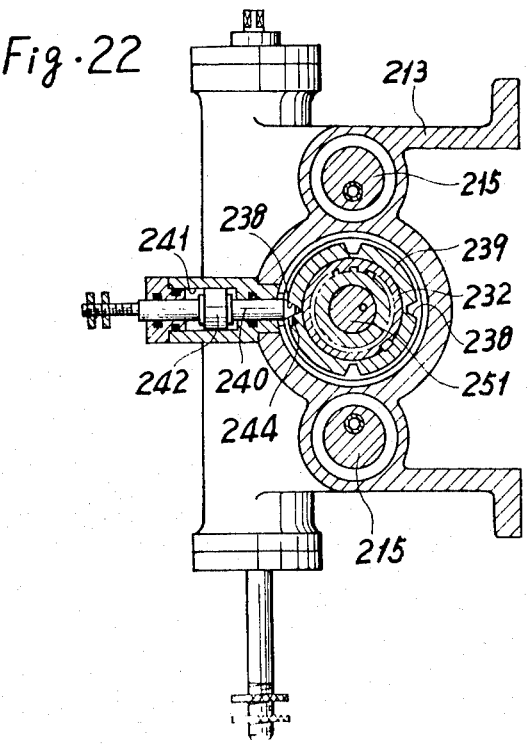
FIG. 22 is a sectional view taken along the line 22—22 of FIG. 19.

As shown in FIG. 22, an indexing plate 239 having four equally divided tapered recesses 238 is secured on the rear end portion of the sleeve 232. A locating shaft 240 having a tapered face 244 adapted for engagement with one of the tapered recesses 238 is connected to a piston 242 of a cylinder 241 secured to the housing 213. When the piston 236 is moved upward, the locating shaft 240 is controlled to disengage from the recess 238. Upon engagement of the upper end of the piston 236 with the adjusting member 237 to rotate the arm 200 by 90°, a limit switch 246 is actuated to operate the cylinder 241 to move the locating shaft 240 into engagement with the recess 238, thereby preventing rotation of the arm 200. The rack piston 236 is thereafter moved downward without rotating the arm 200 by means of the one way clutch 234.

In the rear end portion of the operating shaft 214, there is provided a cylinder 250 in which is slidably received a piston 215. The piston rod 252 of the piston 251 passes through the end cap of the cylinder 250 and is rotatably received in a supporting bracket 253 secured to the housing 213. The piston 251 has therein two longitudinally disposed passages 254 and 255, one end each respectively opening into opposite chambers divided by the piston 251 of the cylinder 250. The other ends of the passages 254 and 255 are respectively connected through annular grooves 256 and 257 formed on the outer periphery of the piston rod 252 to supply-exhaust ports 258 and 259 of the supporting bracket 253. Supply and exhaust of the pressure fluid from either of the supply-exhaust ports 258 and 259 permits the operating shaft 214 and the arm 200 to move axially to effect insertion and extraction of the tool from the tool socket. The rack piston 236 may rotate the arm 200 in any axial position of the operating shaft 214 due to the splined engagement at 231.

Referring to FIGS. 23 to 23E, the entire tool change operation is described, the operation of each constructive part being controlled in a known manner by a programmed information of a numerical control system.

In FIG. 23, a machining operation is being performed by a tool T58 and the tool socket 88, holding therein a tool T59 for a succeeding machining operation, follows the movement of the spindle head 31, while maintaining the tool T59 in its inoperative position. The arm 201 of the sub-transfer arm 200 opposes the tool change position 190 of the tool storage magazine 130 with the grips 203 and 204 of the arm 200 being open.

During the machining operation by the tool T58, the sub-transfer arm 200 is turned clockwise by 90° to cause the arm 202 to oppose the tool change position 190 and the tool storage magazine 130 is rotated to index a tool TO1 for the next succeeding machining operation to the tool change position 190. Upon completion of indexing the tool TO1 to the tool change position 190, the grips 204 are closed to grasp the tool TO1, as shown in FIG. 23A, and the arm 200 is then advanced axially to extract the tool TO1 from the magazine 130. Upon extraction of the tool TO1 from the magazine 130, the arm 200 is further turned clockwise by 90°, as shown in FIG. 23B, and then retracted axially. This is performed while the machining operation is being performed by the tool T58.

Upon completion of the machining operation by the tool T58, the tool socket 88 is turned to its operative position and the main transfer arm 41 is turned clockwise by 90° to permit the grips 42 and 43 to grasp the tools T58 and T59, respectively. After the grips 42 and 43 grasp the tools T58 and T59, respectively, the main transfer arm 41 is advanced axially to extract the tools T58 and T59 and then is turned counterclockwise by 180° and retracted axially to interchange the tools, as shown in FIG. 23B. Upon interchanging of the tools, the grips 42 and 43 are opened and turned clockwise by 90° to be located horizontally, as shown in FIG. 23C, in the original inoperative po position position thereof.

The machining operation by the tool T59 is then started. At the same time the tool socket 88 is moved upward toward the tool change position 195, independent of the movement of the spindle head 31, to exchange the used tool T58 for the new tool TO1. When the tool socket 88 is moved into the tool change position 195, the grips 203 of the arm 201 are closed to grasp the tool T58, as shown in FIG. 23C, and the sub-transfer arm 200 is then advanced axially to extract the tool T58 from the tool socket 88. The sub-transfer arm 200 is thereafter turned clockwise by 90° and then retracted axially to insert the tool TO1 grasped by the grips 204 of the arm 202 into the tool socket 88. Upon insertion of the tool TO1 into the tool socket 88, the grips 204 of the arm 202 are opened, as shown in FIG. 23D, and the arm 200 is again advanced axially.

At the same time, the tool socket 88, now holding the tool TO1 therein, is turned to its inoperative position and subsequently is moved downwardly to follow the movement of the spindle head 31.

After being advanced axially, the arm 200 is turned clockwise by 90° and then is retracted axially to return the tool T58 to its original tool socket 138 which has been indexed to the tool change position 190. Then the grips 204 are opened, as shown in FIG. 23E, whereby one cycle of the tool change operation is accordingly completed.

While the invention has been described by means of a specific embodiment it should be understood that the novel characteristics thereof may be incorporated in the other structural forms without departing from the spirit and scope of the invention as defined in the following claims.

What is claimed as new and desired to be secured by Letters Patent of the United States is:

1. An apparatus for machining a workpiece comprising:
    a bed;
    an upstanding column mounted on said bed;
    a spindle head mounted on said upstanding column for movement vertically thereon;
    a spindle rotatably mounted in said spindle head and adapted to receive diverse machining tools;
    a tool storage magazine for removably storing said diverse tools being mounted in spaced relation with said bed;
    means for selectively indexing said diverse tools to a tool change position on said magazine;
    a carriage mounted on said column for parallel movement with said spindle head;
    tool holding means mounted on said carriage;
    means for moving said tool holding means between a first predetermined position with respect to the axis of said spindle and a second predetermined position with respect to said tool change position on said magazine;
    main transfer means mounted on said spindle head for transferring a tool between said spindle and said tool holding means in said first predetermined position;
    sub-transfer means connected to said magazine for transferring a tool between said tool holding means in said second predetermined position and said tool change position on said magazine;
    first control means for permitting said carriage to follow the movement of said spindle head for maintaining said tool holding means in said first predetermined position so that the tool exchange by said main transfer means may be made between said spindle and said tool holding means;
    second control means for rendering the follow movement of said carriage with respect to said spindle head inoperative and for moving said tool holding means into said second predetermined position so that the tool change operation between said tool holding means and said tool change position on said magazine may be carried out by said sub-transfer means.

2. Apparatus as set forth in claim 1, wherein said tool holding means is rotatably mounted on said carriage, and further including:
    means for rotating said tool holding means to position said tool holding means in predetermined angularly displaced relation with respect to the axis of said spindle during a machining operation and to position said tool holding means in parallel relation with the axis of said spindle when a tool exchange is to be performed.

3. Apparatus as set forth in claim 1, wherein said tool storage magazine comprises upstanding brackets positioned in spaced relation with said bed;
    base plate means mounted on said brackets;
    a plurality of sprocket wheels rotatably mounted on said base plate means;
    flexible endless chain means engaged by said sprocket wheels;
    a plurality of tool sockets for removably storing said diverse tools being connected to said chain means; and
    drive means operably connected to one of said sprocket wheels for driving said endless chain.

4. Apparatus as set forth in claim 3, further comprising guide means on said base plate means for guiding a roller rotatably secured to each of said tool sockets to support the weight of each tool socket.

5. Apparatus as set forth in claim 1, wherein said sub-transfer means further comprises a pair of tool grasping means, one of said tool grasping means being operable for extracting a tool in the tool change position on said magazine and to insert the same into said tool holding means in said second predetermined position, and the other of said tool grasping means being operable for extracting a previously used tool from said tool holding means in said second predetermined position to return the same to the magazine.

6. Apparatus as set forth in claim 1, wherein said first control means comprises:
    a pressure fluid supply source;
    servo valve means mounted on said carriage and slidably receiving a servo spool therein; and
    a hydraulic motor operably connected to said tool holding means moving means to drive the same;
    said servo spool being movable in response to movement of said spindle head to control distribution of a pressure fluid from said source to said hydraulic motor, thereby causing said carriage to follow the movement of said spindle head.

7. Apparatus as set forth in claim 6, further comprising:
    a bracket mounted on said carriage;
    a control link pivotally supported on said bracket and having two arms; and
    said spool valve being resiliently urged to bear against one side of one of said arms, the other side of said one arm being adapted to bear against said spindle head, whereby said spool valve is movably responsive to movement of said spindle head.

8. Apparatus as set forth in claim 7, wherein said second control means comprises a push shaft slidably received in said bracket and being resiliently urged to disengage from the other of said arms of said control link; and
- a solenoid secured to said bracket and operable upon energization thereof for moving said push shaft into engagement with the other arm of said control link to disengage said one arm of said control link from said spindle head.

9. An apparatus for machining a workpiece comprising:
- a bed;
- a column mounted on said bed;
- a spindle head mounted on said column for movement thereon;
- a spindle rotatably mounted on said spindle head and adapted to receive a machining tool therein;
- a tool storage magazine for removably storing diverse tools being disposed in independent relation with said spindle head;
- means for selectively indexing a desired tool to a tool change position on said magazine;
- a carriage mounted on said column for movement in a path parallel with that of the movement of said spindle head;
- tool holding means mounted on said carriage;
- power means for moving said carriage;
- main transfer means for transferring a tool between said spindle and said tool holding on said carriage;
- first control means for controlling the operation of said power means in a manner such that said carriage may follow the movement of said spindle head to maintain said tool holding means on said carriage adjacent to said spindle so that the tool transferring operation may be performed by the main transfer means between said spindle and said tool holding means;
- sub-transfer means for transferring a tool between the tool holding means on said carriage and the tool change position on said magazine; and
- second control means for rendering said first control means inoperative and for controlling the operation of said power means in a manner such that said carriage may be moved to a position near the tool change position on said magazine so that the tool transferring operation may be performed by the sub-transfer means between said tool holding means on said carriage and the tool change position on said magazine.

* * * * *